United States Patent [19]

Cullis

[11] 3,877,609

[45] Apr. 15, 1975

[54] MEASURED DOSING DISPENSER UTILIZING FLOW LINE DEFORMER AND METHOD OF DISPENSING

[75] Inventor: Herbert M. Cullis, Silver Spring, Md.

[73] Assignee: Baxter Laboratories, Inc., Morton Grove, Ill.

[22] Filed: Oct. 23, 1973

[21] Appl. No.: 408,708

Related U.S. Application Data

[63] Continuation of Ser. No. 179,914, Sept. 13, 1971, abandoned.

[52] U.S. Cl. .................... 222/1; 222/214; 222/309
[51] Int. Cl. ............................................ B65d 37/00
[58] Field of Search .......... 222/214, 309, 255, 318, 222/386.5, 380, 424, 1; 417/313, 383, 394, 389; 73/425.6

[56] References Cited
UNITED STATES PATENTS 3,007,416  11/1961  Childs .................................. 417/383
3,190,321   6/1965  Robinson .......................... 417/477 X
3,197,285   7/1965  Rosen ............................... 73/425.6 X
3,572,130   3/1971  Goldsmith .......................... 73/425.6

FOREIGN PATENTS OR APPLICATIONS 12,657   7/1903   Norway ............................... 417/394

Primary Examiner—Robert B. Reeves
Assistant Examiner—David A. Scherbel
Attorney, Agent, or Firm—Richard G. Kinney; Samuel B. Smith, Jr.

[57] ABSTRACT

A dispensing apparatus provides a fluid flow path of the recirculating type. A pump provides circulation of fluid within the flow path from a reservoir through a dispenser whose nozzle output may be disposed for dispensing. An actuator is coupled to the dispenser and operates to dispense from the nozzle an accurate measured volume of fluid at times when the pump is inoperative and the fluid within the flow line is otherwise static. Fluid is dispensed upon distortion of the flow line as a result of displacement of surrounding fluid in a closed system.

9 Claims, 3 Drawing Figures

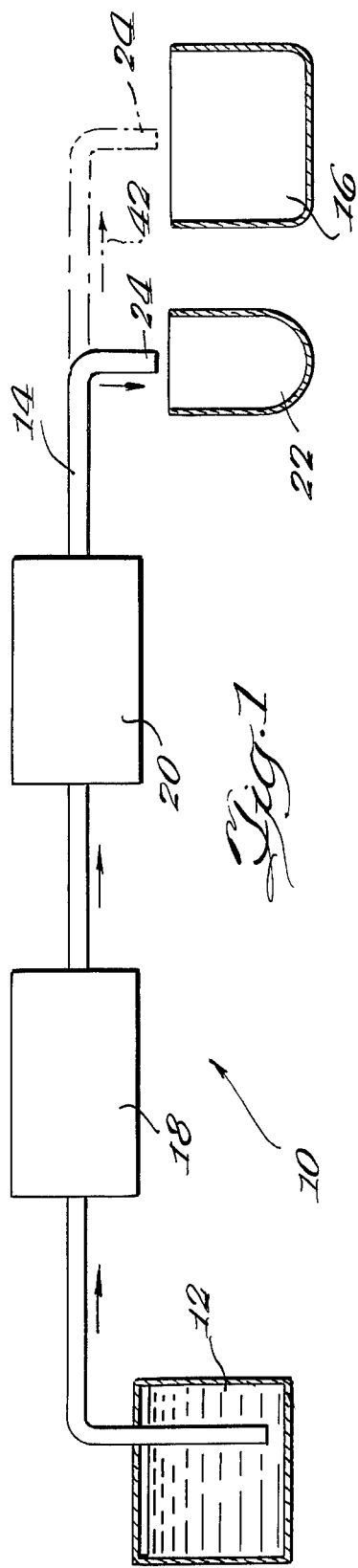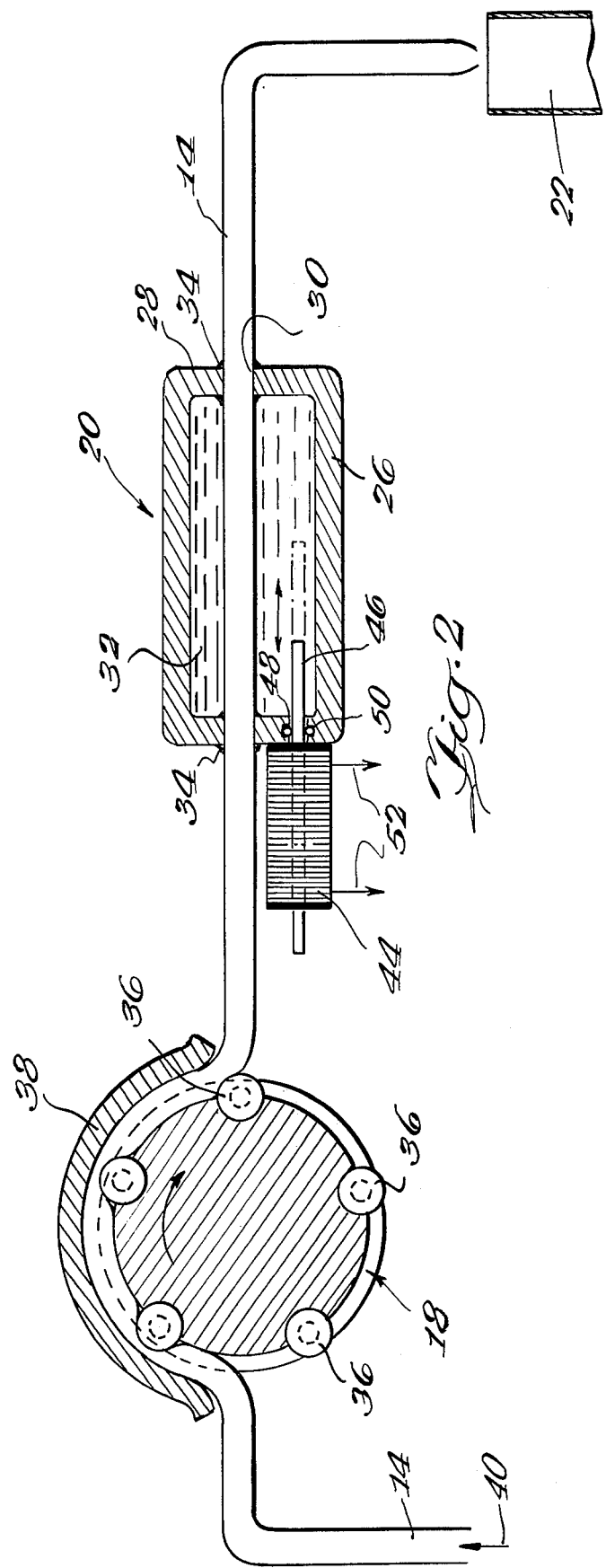

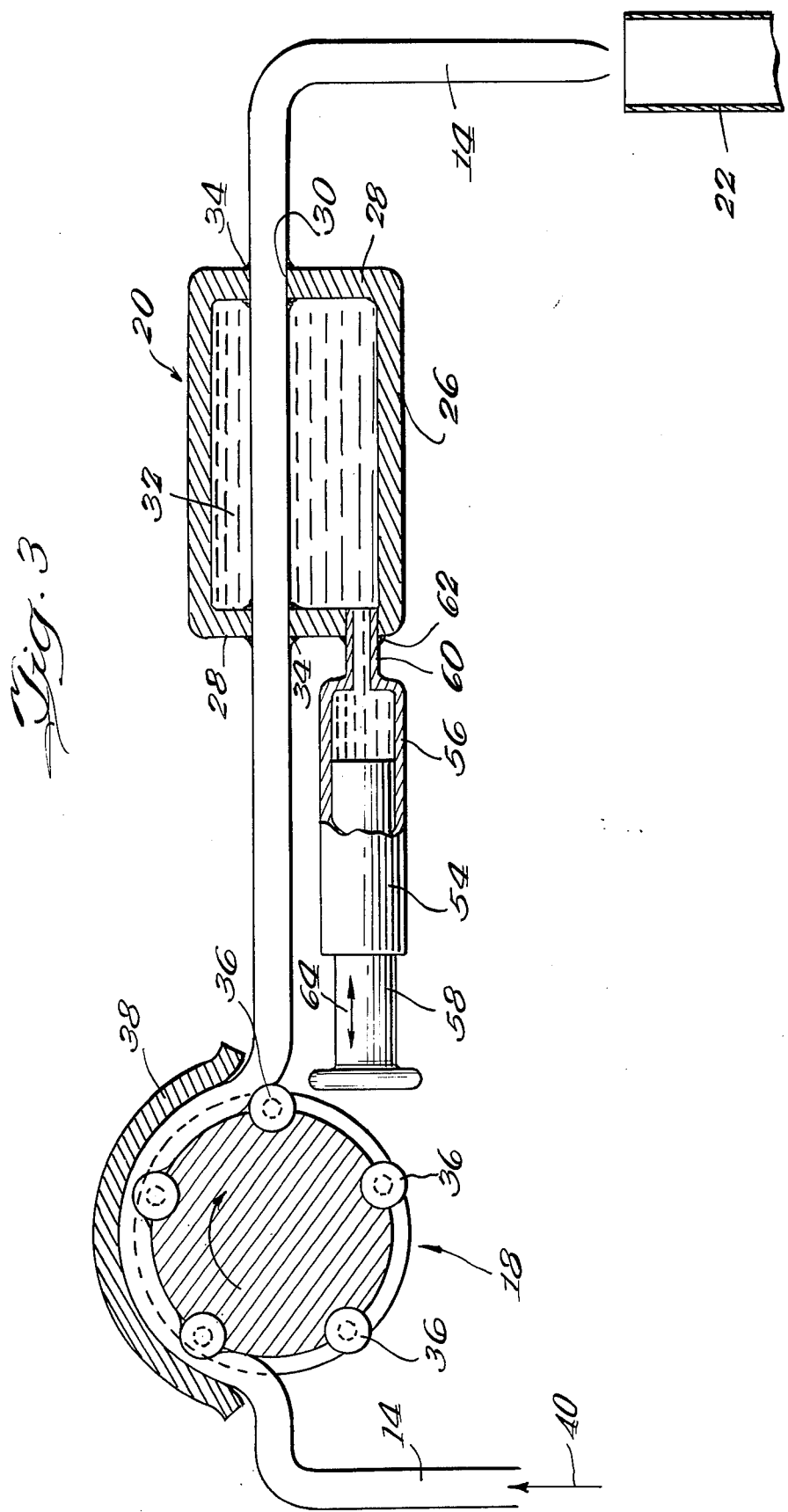

MEASURED DOSING DISPENSER UTILIZING FLOW LINE DEFORMER AND METHOD OF DISPENSING

This is a continuation of application Ser. No. 179,914, filed Sept. 13, 1971, now abandoned.

This invention relates to the dispensing of liquids. More particularly the invention relates to a system and to a device therein which is capable of dispensing a precisely measured volume of liquid from a straight through liquid carrying tube upon the distortion of the tube as an incident to displacement of surrounding fluid in a closed system.

In the analytical field it is often necessary to dispense precisely measured volumes of liquid reagents in the performance of any one of a host of test procedures. For example, in biological testing and more particularly in a test for the determination of prothrombin or clotting time of blood it is necessary to dispense into a measured volume of blood or plasma and a coagulant, such as thromboplastin, calcium ions to initiate the clotting reaction. For proper results it is necessary that the volumes dispensed be of some precision. To this end the prior art has developed various forms of pipette and burette devices.

While such devices are now and have been heretofore satisfactorily used by clinicians in the performance of biological, pharmaceutical and other procedures many of the devices are subject to certain problems. In this connection the liquid to be dispensed from a brunette or to be both aspirated and thereafter dispensed from, for example, a pipette may contact internal piston arrangements, valves, or similar pumping structure causing corrosive action and/or lubricating problems with moving parts. Further, unless care is exercised the integrity of the aspirated volume will be impaired by creation of air emboli or suffer other problems because of flow within and through dead space cavities of the fluid passage or fluid chamber of the system. A major problem, however, is the lack of precision in operation of the prior art devices.

U.S. Pat. No. 3,257,558 to Warren K. Hillquist relates to a pipette-type fluid control apparatus which is somewhat similar to the apparatus of the present invention. As described in the patent the Hillquist apparatus includes a sample chamber which is connected to a source of pressure by a passage. Preferably negative pressure serves to aspirate a volume of fluid into the chamber. Hillquist provides for adjustment for flow of fluid. To this end he provides a control device in the form of a roller which is biased into contact with a flexible tubular portion of the passage. Control of the volume of fluid sample aspirated into the chamber is effected by transversely restricting the cross-section of the passage. More particularly the patent describes that the roller is movable axially along the tube thereby to change the internal volume of the tubular portion between the chamber and the control device. Thus, movement of the control device away from the chamber permits through a pressure differential sample to be aspirated into the chamber. Movement thereafter of the roller chamber permits the dispensing of the fluid.

The present invention relates to an apparatus which constitutes an improvement in dispensing apparatus because of the precision dispensing capability. The precision is obtained through a rather uncomplicated and a relatively simple to operate device. The apparatus of the invention may be used in any application where piston-type displacement burettes are currently used and, as will be brought out, substantially eliminates the problems in the prior art, i.e., liquid contact with pistons, to name one. In some respects the structure of the present invention is similar to the structure of the aforementioned Hillquist device, although the present device is characterized as a burette rather than a pipette. More importantly, however, the apparatus of the present invention provides a significant improvement over the Hillquist apparatus in the critical matter of control of dispensed liquid volumes. To this end the device of the present invention is inherently precisely calibratable by application of hydrostatic pressure generated through displacement of liquid in a closed volume. This will be discussed below. On the other hand, the Hillquist device is not as precisely calibratable by implementation of a mechanical roller for deforming a flexible tube.

In an important aspect of the present invention the dispensing device includes a tube providing a flow through passage supported at spaced locations by a substantially cylindrical rigid walled member thereby to create an annular opening between the tube and member. A fluid which is preferably noncompressible is disposed in a closed volume within the opening. The fluid is in contact with the tube throughout the unsupported length and through fluid displacement distorts or deforms the tube wall with a consequent change in tube volume within the unsupported length. The amount of fluid displacement resulting in liquid being dispensed from the tube is precise (by the dimensions and the linear traverse of the armature.)

As hereinafter described in detail, the dispensing device of the present invention may utilize various forms of actuator or fluid displacing means. To this end, in one form, the invention contemplates a reciprocating rod movable within an annular opening and the enclosed fluid thereto. Through a measured stroke of the rod, fluid within the closed system is displaced causing distortion of the tube along its unsupported length. The rod may be moved through operation of a diaphragm in response to pressure variations, through other pneumatic means or may comprise the armature of a solenoid. It is also contemplated that fluid within the closed system may be displaced by movement into and out of the annular opening of a lead screw driven by a motor or otherwise. Additionally, the actuator may be in the form of a syring-type construction. To this end a volume of fluid is passed into the closed system. By increasing the total fluid volume or by displacing the initial volume of the closed system there is a consequent deformation of the walls of the unsupported tube resulting in a known volume of liquid being dispensed. Operation of the actuator preferably is controlled by a program. However, it is intended that operation also may be controlled manually.

In another aspect, the present invention provides a device which is capable of dispensing liquid volumes without having first to purge the device. In this connection because of the contant flow of liquid at all times other than at times when a dispensing operation is in progress there is no dead space in the flow line and the dispensing tip. A pump or valve upstream of the dispenser when shut down or closed prevents back flow in the fluid line yet the fluid volume between the pump and the dispensing tip remains static preparatory to the dispensing operation.

In accordance with a further aspect of the present invention, the dispensing apparatus forms a part of a dispensing system. In this connection the system, if a return flow is desired, provides a reservoir from which and to which fluid is pumped. This operation may be preferred since the recirculating flow maintains solution or suspension homogeneity. A pump is provided in the system to provide a constant flow through the dispensing device. The pump is shut down during dispensing to occlude the fluid flow line thereby to provide a static fluid volume between the pump and the dispensing tip. A portion of this volume is dispensed. The operation may be programed. Thus, the program includes a signal to stop the pump, to position the dispensing tip over a particular receptacle for test and to operate the actuator. The actuator is precisely calibratable. In this connection the amount of fluid displacement in the closed system may be determined. Consequently the volume of the static fluid dispensed through tube deformation upon increase in hydrostatic pressure is known with precision.

In a further aspect of the present invention the apparatus may serve to dispense precise volumes of an aspirated sample as well as to dispense diluted volumes of the sample. Aspiration is accomplished because the liquid in the line is not compressible and through reverse operation of the rod, screw actuator or otherwise a slight vacuum may be created. If a precise volume, i.e., a measured portion of sample is to be dispensed operation will be as discussed. Thus, 1 ml. of sample may be aspirated and a measured portion thereof dispensed. That portion dispensed will be substantially pure sample for there will be appreciably no intermix within the flow line.

However, a dilution or multiple dilutions may also be made. Thus, 1 ml. of sample may be aspirated and dispensed with 9 ml. of diluent. This may be repeated to obtain, for example, 0.1, 0.01, etc. percent solutions. The line will effectively be flushed in either case by the diluent.

There has thus been rather broadly outlined the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for the designing of other devices for carrying out the several purposes of the invention. It is important, therefore, that the claims be regarded as including such equivalent constructions as do not depart from the spirit and scope of the invention.

Specific embodiments of the invention have been chosen for the purpose of illustration and description and are shown in the accompanying drawing forming a part of the specification wherein:

FIG. 1 is a schematic block diagram of a dispensing system;

FIG. 2 illustrates the dispensing unit in a sample dispensing position, a pump arrangement and a form of actuator; and FIG. 3 is a view similar to FIG. 2 showing a further form of actuator.

The dispensing system 10 may be seen in FIG. 1. The system may be of either the recirculation or single pass circulation type, both of which are well-known to the art. For the purpose of illustration and not by way of limitation the drawing figures illustrate a single pass circulation system including a reservoir 12 and a straight through fluid flow line 14 connecting the reservoir to a receptacle 16. The system also includes a pump 18 to pump fluid through the line and a dispenser 20 operable to dispense a measured volume of fluid from the line. The system which has briefly been discussed above may function to dispense precise volumes or to aspirate precise sample volumes and, if desired, dilute the sample. Thus, the reservoir may contain reagent or diluent depending upon the operation. A second receptacle 22 serves either to receive reagent preparatory to a chemical reaction under observation takes place or to supply sample for any purpose whatever. The line may then be suitably flushed. Hereinafter, for the purpose of discussion, the dispensing operation will be considered.

Means (not shown) responsive to a program or manually activated provide movement of the dispensing or part tip 24 from receptacle 16 to receptacle 22. The same means prior to initiation of the above movement functions to terminate pump operation thereby to occlude the flow line 14 and form a static column of fluid between the pump and tip 24. The means then energizes an actuator, as will be discussed below, to dispense a predetermined measure volume of fluid within the column from the tip 24. It should be appreciated that a valve may be used to occlude the flow line, but a pump is preferred.

The particular fluid disposed within the reservoir 12 will be determined by the test procedure. If the procedure is, for example, a biological test for the determination of prothrombin time the reservoir may provide a solution or suspension including calcium ions to be dispensed into the receptacle 22 containing a predetermined volume of blood or plasma and a thromboplastin coagulant. The actuator may provide a signal to start a timer for measuring the time interval within which clotting occurs. In this connection the initiation of clotting would cause a response to deactivate the timer for visual readout.

The present dispensing apparatus, however, may be utilized in a host of procedure requiring the use of solutions containing ions other than calcium. It may also be used in pharmaceutical procedures requiring utmost precision. Some of these solutions may require agitation to maintain constituents in suspension. To this end it is contemplated to incorporate mixing means (not shown) in the reservoir. on the other hand, a recirculation system suitably provides the desired amount of agitation of suspension thereby to maintain the homogeneity.

The dispenser 20 is in the form of a rigid wall structure 26, providing in the opposed closed ends 28 a pair of openings 30 coaxially aligned. Tube 14 is received through the openings 30 thereby to be supported by the end walls 28 in a fashion to provide substantially an annular cavity 32 within the dispenser and surrounding the tube. A noncompressible fluid medium fills the annular space. Sealing means 34 surrounds the tubing 14 at each opening 30 providing against leakage from the cavity and thereby maintaining the prescribed volume of medium within the annular space.

Fluid is passed from the reservoir 12 to either the receptacle 16 or the sample receptacle 22 by means of a pump 18. In FIG. 2 the pump is illustrated as including a plurality of roller members 36 which are supported for movement about an axis and along a length of the tubing. The tubing is supported by a stationary wall 38 on one side and rollers 36 on the other side. The pump as illustrated in FIG. 2 is generally referred to as a peristaltic-type pump although it should be apparent that a pump of most any type may be employed. The pump operation provides a substantially continuous flow of fluid from the reservoir in the direction of arrow 40.

As previously indicated the operation may be programmed. According to the program the pump 18 will be first stopped to occlude flow of fluid through the line in either direction. A slight vacuum in the line will prevent any fluid in the line from exiting the tip 24 thereby maintaining a fluid column. The program also functions to remove the tip from a dispensing disposition above the receptacle 16 and to relocate the tip above the sample receptacle 22 preparatory to the dispensing operation. Movement of the tip, suggested by the arrow 42, may be accomplished by any suitable means.

Operation of the dispensing actuator 44 is also initiated by the program. In FIG. 2 the actuator is in the form of a solenoid having a reciprocating rod or armature 46. The armature is received within the annular space through an opening 48 in end wall 28. An O-ring 50 both maintains a fluid seal and functions as a bearing surface permitting sliding reciprocation of the solenoid armature.

A pair of leads 52 electrically connect the solenoid within the program circuit.

FIG. 3 illustrates a similar arrangement. The Figure, however, shows a further form of actuator 54 which may be employed in the apparatus. The actuator may be in the form of a syringe including a barrel 56 and a piston 58 movable therein. A nozzle 60, forming an extension of the barrel, is received through the end wall 28 thereby communicating the barrel chamber with the annular space. Sealing means 62 surround the nozzle to maintain constant the fluid volume within both the annular space and the barrel and tip.

Means in the form of a cam, motor or other suitable operator (not shown) responsive to the program may be provided as an operator for piston 58 in the directions of arrow 64.

Other actuators may be employed. For example, the solenoid or syringe actuator may be replaced by a pressure diaphragm construction responsive to a pressure change and including a follower rod for fluid displacement within the annular space as in the FIG. 2 embodiment. Also, the actuator may be a lead screw-type device. However, the rod is preferred because the external surface may be precisely machined thereby to present a constant cross-section.

At least the length of tubing within the dispenser 20 and the length of tubing contacted by the rollers 36 of the pump 18 will be deformable. In this manner the tube may be occluded and through the operation discussed above displacement of the fluid medium within the space will serve to deform the tube supported between walls 28. Additionally the tubing should be of a type not deleteriously affected by the liquids to be dispensed or sampled and have a return memory to permit sequentially a plurality of dispensing operations. Also, the tube preferably should exhibit the same degree of deformation along its deformable length and directly follow the displacement. Many resilient and deformable materials, such as polyvinyl plastics and neoprene to name a few, may be utilized. However, it is preferred to use pure gum rubber for the tube material.

The dispenser may dispense sequentially several identical or different volumes upon operation. In this connection each dispensing operation may follow an incremental advance of the rod through a full stroke. Thus, for example, full stroke of a given particular actuator rod may function to dispense 1.0 ml. of liquid, which each incremental 0.1 full stroke advance will effectively dispense 0.1 ml. of liquid. The volume dispensed is related linearly to the stroke length. More particularly 1 ccm. of fluid displacement within the closed system will effectively dispense 1 ml. of liquid. In a like manner introduction of fluid into the closed system will effectively dispense a like volume. Whereas a linearly relationship exists between rod stroke and volume dispensed, a substantial logarithmic relation exists between rod cross-section and volume dispensed.

After each dispensing or series of partial dispensing operations the pump or valve is activated to purge the line by fluid flow. A lesser or greater volume may be dispensed by selection of stroke length and rod cross-section.

In a preferred embodiment of the present invention the dispenser rod has constant diameter rof 0.47 cm. and has a stroke length of 5.67 cm. This stroke length provides 1 ccm. of displacement within the closed piston and 1 ml. of liquid is dispensed. Incremental advances of, for example, 0.567 cm. in stroke will function to dispense 0.1 ml.

The following criteria is not critical to the operation and to the consideration of precision of dispensed volumes. However, the criteria has been chosen to accommodate the rod dimension and stroke length. Thus, the dispenser has an overall length of approximately 6 cm. and an internal diameter sufficient to include therein a tube having an internal diameter of 0.25 in. and a wall thickness of 1/16 in. yet provide an annular dimension to permit free stroke travel of the rod 46. The particular volume of fluid within the closed system need only be sufficient to fill the annular space.

By varying the rod cross-section and stroke the displaced volume of the fluid medium may be varied within any desired range.

From the foregoing it is seen that the dispenser enables a fluid to be dispensed from a reservoir without contacting any valve or dead space or contacting any surface except the surface of the conducting tubing thereby to eliminate corrosive action and lubricating problems. It has further been seen that the control of the dispenser is precise due to the fact that tube deformation is the result of precision in the control of fluid displacement in a closed volume. Also, by the provision of a recirculating system the solution or suspension to be dispensed will be thoroughly and continuously mixed to prevent settling of any particulate matter within either the reservoir or the flow line. Additionally, it is seen that the apparatus of the present invention provides an improvement over a standard burette by providing fluid loading of the dispenser through pump operation rather than through piston operation and the requirement of pulling a partial vacuum.

Having described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

Having described the invention, what is claimed is:

1. A system for dispensing precisely measured volumes of liquids, comprising:
   a reservoir for holding liquids;
   a liquid conduit, having a dispensing port, said conduit coupled to the reservoir for receiving liquids therefrom;
   means coupled to the conduit for filling it with liquid and for occluding the conduit to hold a substantially static liquid column therein which column extends to the dispensing port; and
   dispensing means including a housing enveloping a distortable portion of said conduit providing a closed space therearound, noncompressible fluid medium filling said space, and means for displacing a selected volume of said medium within said closed space thereby to distort said enveloped distortable portion of said conduit, whereby a precisely measured volume of fluid equal to said selected volume may be dispensed from said conduit via said port.

2. The invention of claim 1 wherein said means for occulating the conduit includes means for closing a flexible portion thereof.

3. The invention of claim 1 wherein said means for filling the conduit includes a pump.

4. The invention of claim 1 wherein said port is of small size so as to prevent loss of fluid therefrom when the static column is formed.

5. The invention of claim 1 wherein the conduit is formed of a unitary flexible line and said means for filling and occulating the conduit is peristaltic pump.

6. The system of claim 1 wherein said housing is of rigid wall construction.

7. The system of claim 1 wherein said displacing means comprises a rod movable between limits within said closed space, and means for moving linearly said rod.

8. The system of claim 1 wherein said displacing means comprises a syringe having a chamber mounted on said housing to provide fluid communication between said closed space and said chamber, a noncompressible fluid medium within said chamber, a piston within said chamber, and means for moving said piston to pass fluid from said chamber.

9. The method of dispensing a precisely measured volume of liquid using a conduit having a dispensing port and also including a deformable portion which portion is surrounded by a housing to provide a closed space thereabout with a noncompressible fluid medium filling that closed space, and means for selectively displacing said medium to distort that portion, the conduit being coupled to a reservoir of liquid, comprising the steps of:
   a. filing said conduit with liquid from said reservoir;
   b. occulding said conduit to isolate the reservoir from both the port and deformable portion and to hold therein a column of fluid which extends to the port; and
   c. operating said means for selectively displacing said medium to distort the surrounding conduit portion and thereby displace a selected volume of said medium and cause a volume of fluid equal to said selected volume to be dispensed from said port.

* * * * *